May 29, 1934.　　　　　J. EATON　　　　　1,961,037

POSITION INDICATOR

Filed Aug. 21, 1931

Inventor:
John Eaton,
by Charles E. Mullen
His Attorney.

Patented May 29, 1934

1,961,037

UNITED STATES PATENT OFFICE 1,961,037

POSITION INDICATOR

John Eaton, Schenectady, N. Y., assignor to General Electric Company, a corporation of New York Application August 21, 1931, Serial No. 558,521

3 Claims. (Cl. 177—336)

My invention relates to elevators, and more particularly to means for reproducing the position of an elevator in a hatchway, and has for an object the provision of a simple, inexpensive and reliable means of this character.

In carrying out my invention in one form, I utilize the weight of a rope or cable having one end attached to the elevator and its other end secured in the hatchway so that the cable hangs in the hatchway in a loop below the elevator. As the elevator moves in the hatchway, the proportionate parts of the weight of the cable supported at each end varies with the position of the elevator and thus is an indication of its position. I have also provided suitable means responsive to these variations in weight cooperating with one or both ends of the cable to operate suitable control means or position indicating means.

Figure 1:
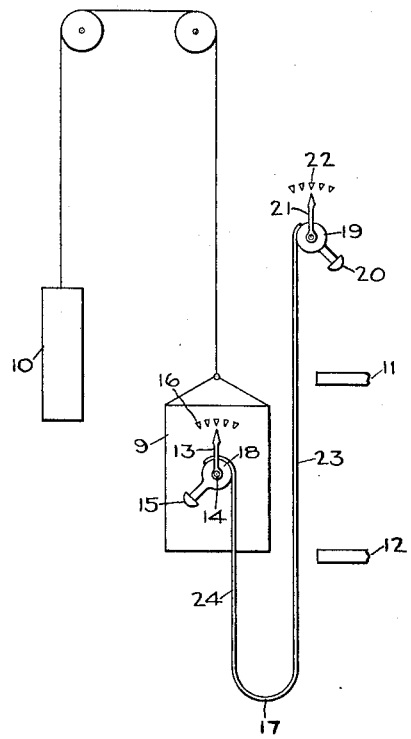
Figure 2:
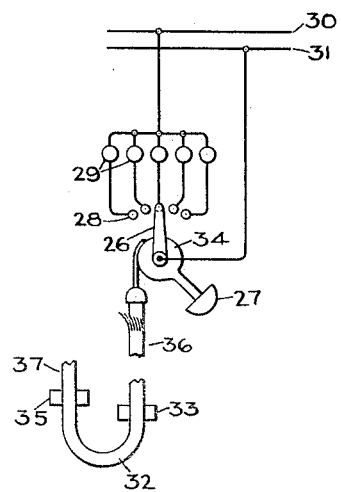

For a more complete understanding of my invention, reference should now be had to the drawing, in which Fig. 1 shows in accordance with my invention a position indicating system as applied to an elevator, while Fig. 2 shows a modified form of my invention for controlling a plurality of position signaling lamps.

Referring to the drawing, I have shown my invention in one form as applied to an elevator 9 provided with a counterweight 10 and arranged to be driven by any conventional driving means along a hatchway between a plurality of floors, two of which are indicated by the reference numerals 11 and 12. To signal the position of the elevator 9 within the hatchway, a position follower or pointer 13 is rotatably mounted on a shaft 14 within the elevator. The follower 13 is biased in a counter-clockwise direction by suitable means such as a pendulum weight 15 secured to the pointer and rotatably carried by the shaft 14. It is moved over a scale 16 by means of a gravity device which applies a force on the position follower or pointer in a clockwise direction as the elevator rises in the shaft, and decreases said force as the elevator descends. As shown, this gravity means takes the form of a wire rope or cable 17, which is secured at one end to a curved hub portion 18 of the counterweight 15, and at the other end to a fixed point in the hatchway. As shown, the upper end of the rope is secured to a cylindrical hub 19 of a counterweight 20 of a second indicating mechanism. As before, a position follower or pointer 21 is secured to the counterweight 20 and is movable over a scale 22 graduated in floors. The weight of the section 23 of the rope 17 tends to move the pointer 21 in a counter-clockwise direction against the gravity bias provided by the counterweight 20. The pointer 13 of the indicating mechanism in the elevator is similarly urged over the scale 16 in a clockwise direction against the gravity bias provided by pendulum weight 15 by the weight of section 24 of rope 17.

It will be observed that as the elevator 9 moves up the shaft, the section 24 of the rope 17 lengthens, increasing the weight applied to the curved or cylindrical hub 18, and by such increased weight the position follower 13 is moved in a clockwise direction. As section 24 of the rope 17 is lengthened, the section 23 is shortened, thereby decreasing the weight applied to the cylindrical hub 19. The pendulum weight 20 thereupon moves the position indicator 21 in a clockwise direction. It will thus be seen that the weight of the rope 17 shifting from one indicator to the other in accordance with the movement of the elevator in the hatchway causes the pointers 13 and 21 to reproduce the movements of the elevator.

The gravity biasing means for the pointers minimizes inertia effects caused by the rapid acceleration of the elevator. Assuming that the elevator is rapidly accelerating up the hatchway, the effect of the inertia of the weight of the section 24 of the rope 17 is to cause a greater indicated weight on the position follower. However, the inertia of the pendulum weight 15 also resists acceleration and a greater bias is applied to the position follower, thereby substantially neutralizing the inertia effect of the section 24.

Instead of providing a scale calibrated in floors, the weight responsive pointer may be arranged to energize relays for controlling the movement of the elevator or to control the energization of signal lamps and the like. As shown in Fig. 2, a position follower 26 is biased in a clockwise direction by a pendulum counterweight 27, the follower 26 being arranged for rotation over a plurality of contacts 28 to selectively control the energization of a plurality of signal lamps 29 from the supply lines 30 and 31. The rotation of the follower 26 against the gravity bias of the counterweight 27 is accomplished by securing the elevator control cable 32 to a cylindrical hub 34 provided on the pendulum weight 27. The elevator control cable is looped below the elevator, and, as already explained in connection with Fig. 1, applies a force to move the follower 26 in accordance with the movement of the elevator.

To insure a more positive response of the pointer 26 to the movement of the elevator, an additional weight is added to control cable 32 for each floor, two of which are indicated by reference numerals 33 and 35 and are so spaced apart that the weight 33 on the section 36 of the cable 32 is transferred to the section 37 as the elevator reaches a floor. Assuming now that the elevator is moving down the hatchway, thereby increasing the force applied to the position follower 26, the effect of the transfer of the weight 35 from the section 37 of the cable 32 to the section 36 is to cause a considerable response of the follower 26, thereby insuring that the follower 26 immediately takes a new position to energize a signal lamp.

While I have shown a particular embodiment of my invention, it will be understood of course that I do not wish to be limited thereto, since many modifications may be made, and I therefore contemplate by the appended claims to cover any such modifications as fall within the true spirit and scope of my invention.

What I claim as new and desire to secure by Letters Patent of the United States, is:

1. Means for reproducing the movements of an elevator in a hatchway, comprising a pointer mounted on said elevator, weight shifting means responsive to movements of said elevator in said hatchway for moving said pointer, and gravity means biasing said pointer against movement by said weight shifting means so that the inertia of said gravity means and said weight shifting means substantially compensate for inertia effects introduced by the movements of said elevator.

2. In combination with an elevator, a position indicator mounted on said elevator comprising a pointer movable over a scale, a pendulum weight connected to said position indicator so as normally to bias said indicator to one position on said scale, weight shifting means responsive to movements of said elevator for moving said pointer against the bias of said pendulum weight across said scale, the said pendulum weight substantially neutralizing the inertia effects introduced by the movements of said elevator on said weight shifting means.

3. Means for reproducing the movements of an elevator in a hatchway comprising a cable for the elevator, a position indicator having a pointer movable over a scale, gravity means including said cable responsive to the movements of said elevator for applying an operating force on said pointer, and additional weights secured to said cable for producing more positive operation of said indicator when said elevator approaches a predetermined position in said hatchway.

JOHN EATON.